US012609307B2

(12) United States Patent
Lu et al.

(10) Patent No.: US 12,609,307 B2
(45) Date of Patent: Apr. 21, 2026

(54) METHODS OF SYNTHESIZING SINGLE-CRYSTAL LiNIxMnYCo1-X-yO2 AND APPLICATIONS OF THESE MATERIALS

(71) Applicant: THE REGENTS OF THE UNIVERSITY OF CALIFORNIA, Oakland, CA (US)

(72) Inventors: Yanying Lu, El Cerrito, CA (US); Guoying Chen, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 951 days.

(21) Appl. No.: 17/834,076

(22) Filed: Jun. 7, 2022

(65) Prior Publication Data

US 2022/0399543 A1 Dec. 15, 2022

Related U.S. Application Data

(60) Provisional application No. 63/210,335, filed on Jun. 14, 2021.

(51) Int. Cl.
H01M 4/525 (2010.01)
C01G 53/50 (2025.01)
(Continued)

(52) U.S. Cl.
CPC ............ H01M 4/525 (2013.01); C01G 53/50 (2013.01); H01M 4/0497 (2013.01); H01M 4/505 (2013.01); H01M 10/0525 (2013.01);

*C01P 2004/30* (2013.01); *C01P 2004/61* (2013.01); *C01P 2004/62* (2013.01);
(Continued)

(58) Field of Classification Search
None
See application file for complete search history.

(56) References Cited

U.S. PATENT DOCUMENTS

2021/0351404 A1* 11/2021 Xiao ................. H01M 10/0562
2024/0351913 A1* 10/2024 Xiao ..................... H01M 4/131

OTHER PUBLICATIONS

Lu et al., "Single-Crystal LiNixMnyCo1—x—yO2 Cathodes for Extreme Fast Charging," Small, vol. 18, pp. 2105833 (1 of 10), (Jan. 21, 2022).
(Continued)

*Primary Examiner* — Yoshitoshi Takeuchi

(57) ABSTRACT

This disclosure provides systems, methods, and apparatus related to lithium-ion batteries. In one aspect, a method includes synthesizing an intermediate selected from a group of a nickel-manganese-cobalt nitrate, a nickel-manganese-cobalt acetate, a nickel-manganese-cobalt sulfate, a nickel-manganese-cobalt chloride, and a nickel-manganese-cobalt phosphate. The intermediate is mixed with a lithium salt selected from a group of LiOH, LiCl, $LiNO_3$, $LiSO_4$, LiF, LiBr, $Li_3PO_4$, $Li_2CO_3$, and combinations thereof to form a mixture. The mixture is annealed at a sequence of temperatures and times to form a plurality of single crystals of a lithium nickel-manganese-cobalt oxide, with no cooling of the mixture between operations of the sequence of temperatures and times.

10 Claims, 13 Drawing Sheets

400

Synthesize $Ni_{0.8}Co_{0.1}Mn_{0.1}CO_3$ or $Ni_{0.8}Co_{0.1}Mn_{0.1}(OH)_2$; — 410

Mix the $Ni_{0.8}Co_{0.1}Mn_{0.1}CO_3$ or the $Ni_{0.8}Co_{0.1}Mn_{0.1}(OH)_2$ with LiOH to form a mixture — 420

Anneal the mixture at a sequence of temperatures and times to form a plurality of single crystals of $LiNi_{0.8}Co_{0.1}Mn_{0.1}O_2$ — 430

(51) Int. Cl.

| | | |
|---|---|---|
| *C01G 53/502* | (2025.01) | |
| *H01M 4/04* | (2006.01) | |
| *H01M 4/505* | (2010.01) | |
| *H01M 4/52* | (2010.01) | |
| *H01M 10/0525* | (2010.01) | |
| *H01M 4/02* | (2006.01) | |

(52) U.S. Cl.
CPC ... *C01P 2004/64* (2013.01); *H01M 2004/021* (2013.01); *H01M 2004/028* (2013.01)

(56) References Cited

OTHER PUBLICATIONS

Xu et al., "Radially Oriented Single-Crystal Primary Nanosheets Enable Ultrahigh Rate and Cycling Properties of LiNi0.8Co0.1Mn0.1O2 Cathode Material for Lithium-Ion Batteries," Advanced Energy Materials, vol. 9, pp. 1803963 (1 of 9), (2019).

Bi et al., "Reversible planar gliding and microcracking ina single-crystalline Ni—rich cathode," Science, vol. 370, pp. 1313-1317, (Dec. 11, 2020).

Zhang et al., "Surface regulation enables high stability of singlecrystal lithium-ion cathodes at high voltage," Nature Communications, vol. 11, pp. 1-11, (2020).

Fan et al., "Crack-free single-crystalline Ni—rich layered NCM cathode enable superior cycling performance of lithium-ion batteries," Nano Energy, vol. 70, pp. 104450 1-11, (2020).

Liang et al., "Ab Initio Study on Surface Segregation and Anisotropy of Ni—Rich LiNi1—2yCoyMnyO2 (NCM) (y ≤ 0.1) Cathodes," ACS Applied Materials and Interfaces, vol. 10, pp. 6673-6680, (2018).

Kim, "Lithium Nickel Cobalt Manganese Oxide Synthesized Using Alkali Chloride Flux: Morphology and Performance as a Cathode Material for Lithium Ion Batteries," ACS Applied Materials and Interfaces, vol. 4, pp. 2329-2333, (2012).

Qian et al., "Single-crystal nickel-rich layered-oxide battery cathode materials: synthesis, electrochemistry, and intra-granular fracture," Energy Storage Materials, vol. 27, pp. 140-149, (2020).

Wang et al., "Synthesis and Manipulation of Single-Crystalline Lithium Nickel Manganese Cobalt Oxide Cathodes: A Review of Growth Mechanism," Frontiers in Chemistry, vol. 8, pp. 1-8, (2020).

Zheng et al., "All-Dry Synthesis of Single Crystal NMC Cathode Materials for Li—Ion Batteries," Journal of the Electrochemical Society, vol. 167, pp. 1-8 130536, (2020).

Li et al., "High-nickel layered oxide cathodes for lithium-based automotive batteries," Nature Energy, vol. 5, pp. 26-34, (2020).

Langdon et al., "A perspective on single-crystal layered oxide cathodes for lithium-ion batteries," Energy Storage Materials, vol. 37, pp. 143-160, (2021).

You et al., "Research Progress of Single-Crystal Nickel-Rich Cathode Materials for Lithium Ion Batteries," Small Methods, vol. 5, pp. 2100234 (1 of 28), (2021).

Garcia et al., "Surface Structure, Morphology, and Stability of Li(Ni1/3Mn1/3Co1/3)O2 Cathode Material," The Journal of Physical Chemistry C, vol. 121, pp. 8290-8299, (2017).

Yan et al., "Ni and Co Segregations on Selective Surface Facets and Rational Design of Layered Lithium Transition-Metal Oxide Cathodes," Advanced Energy Materials, vol. 6, pp. (1 of 9) 1502455 (2016).

Zhu et al., "Single-Crystal Based Studies for Correlating Properties and High-Voltage Performance of Li [NixMnyCo1—x—y]O2 Cathodes," Journal of Materials Chemistry A, vol. 7 pp. 5463-5474, (2019).

Zhu et al., "Atomic-Level Understanding of Surface Reconstruction Based on Li[NixMnyCo1—x—y]O2 Single-Crystal Studies," ACS Applied Energy Materials, vol. 3, pp. 4799-4811, (2020).

Kim et al., "Understanding Reactivities of Ni—Rich Li[NixMnyCo1—x—y]O2 Single-Crystal Cathode Materials," ACS Applied Energy Materials, vol. 3, pp. 12238-12245, (2020).

Devaruju et al., "Hydrothermal and Solvothermal Process Towards Development of LiMPO4 (M = Fe, Mn) Nanomaterials for Lithium-Ion Batteries," Advanced Energy Materials, vol. 2, pp. 284-297, (2012).

Marker et al., "Evolution of Structure and Lithium Dynamics in LiNi0.8Mn0.1Co0.1O2 (NMC811) Cathodes during Electrochemical Cycling," Chemistry of Materials, vol. 31, pp. 2545-2554, (2019).

Noh et al., "Comparison of the structural and electrochemical properties of layered Li[NixCoyMnz]02 (x 1/4 1/3, 0.5, 0.6, 0.7, 0.8 and 0.85) cathode material for lithium-ion batteries," Journal of Power Sources, vol. 233, pp. 121-130, (2013).

Li et al., "Long-Term Cyclability of NCM-811 at High Voltages in Lithium-Ion Batteries: an In-Depth Diagnostic Study," Chemistry of Materials, vol. 32, pp. 7796-7804, (2020).

Maeng et al., "Enhanced mechanical strength and electrochemical performance of core-shell structured high-nickel cathode material," Journal of Power Sources, vol. 448, pp. 1-10 227395, (2020).

Ryu et al., "3-D dumbbell-like LiNi1/3Mn1/3Co1/3O2 cathode materials assembled with nano-building blocks for lithium-ion batteries," Journal of Power Sources, vol. 257, pp. 186-191, (2014).

Shi et al., "Urea-based hydrothermal synthesis of LiNi0.5Co0.2Mn0.3O2 cathode material for Li—ion battery," Journal of Power Sources, vol. 394, pp. 114-121, (2018).

Lu, Yan, et al., "Hydrothermal Synthesis of Tunable Olive-Like Ni0.8Co0.1Mn0.1CO3 and its Transformation to LiNi0.8Co0.1Mn0.1O2 Cathode Materials for Li—Ion Batteries," ChemElectroChem, vol. 6, Issue22, Nov. 18, 2019, pp. 5661-5670.

Zhang, Chi, et al. "Facile synthesis silkworm-like Ni-rich layered LiNi0.8Co0.1Mn0.1O2 cathode material for lithium-ion batteries," Materials Letters, vol. 201, Aug. 15, 2017, pp. 1-4.

* cited by examiner

400

Synthesize $Ni_{0.8}Co_{0.1}Mn_{0.1}CO_3$ or $Ni_{0.8}Co_{0.1}Mn_{0.1}(OH)_2$; — 410

Mix the $Ni_{0.8}Co_{0.1}Mn_{0.1}CO_3$ or the $Ni_{0.8}Co_{0.1}Mn_{0.1}(OH)_2$ with LiOH to form a mixture — 420

Anneal the mixture at a sequence of temperatures and times to form a plurality of single crystals of $LiNi_{0.8}Co_{0.1}Mn_{0.1}O_2$ — 430

METHODS OF SYNTHESIZING SINGLE-CRYSTAL LiNIxMnYCo1-X-yO2 AND APPLICATIONS OF THESE MATERIALS

RELATED APPLICATIONS

This application claims priority to U.S. Provisional Patent Application No. 63/210,335, filed 14 Jun. 2021, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to lithium-ion battery cathodes and more particularly to methods of synthesizing single-crystal cathode materials.

BACKGROUND

In order to meet the demands in large-scale energy storage, lithium-ion batteries (LIBs) with higher energy density and power density, lower cost, better safety, and longer lifespans are needed. For the growing electric vehicle (EV) market, the next-generation LIBs are expected to meet additional application-specific requirements. The Department of Energy (DOE) has identified extreme fast charging, with a goal of 15 minutes (min) recharge time (6 C equivalent), as one of the essential capabilities in EV batteries. For cathode materials, successful realization of fast-charge requires better kinetics as well as chemical and structural stabilities at the particle level.

Layered lithium transition-metal (TM) oxides with a general formula of $LiMO_2$ (M=Ni, Mn, Co, Al, etc.) are widely used as positive electrode materials for LIBs. Among them, Ni-rich lithium nickel manganese cobalt oxide (LiNi$_x$Mn$_y$Co$_{1-x-y}$O$_2$, x≥0.8) are considered the most promising due to their high energy density. Currently, most commercially available NMC compounds are polycrystalline (PC) secondary particles comprising submicron-sized primary grains with random orientations. The particle surface is terminated with a variety of crystalline facets that are not specified for Li transport. As both Li+ diffusion and volume expansion/contraction upon charge/discharge occur anisotropically in the rhombohedral $\alpha$-NaFeO$_2$-type structure, the random orientation of the primary grains causes prolonged Li+ diffusion pathways and nonuniform Li concentration inside the secondary particles, leading to stress and strain and the eventual intergranular cracking within the particles. In addition, the newly exposed surface area from cracking can lead to further parasitic reactions with the electrolyte. These issues are greatly exacerbated with increasing Ni content as well as the fast-charging conditions. To address them, approaches such as elemental doping and surface coating have been extensively explored, yet they all have met with limited success. It is evident that conventional NMC cathodes are not suitable for fast charge and particle design and engineering are needed in order to minimize internal cracking and improve charge transport capability.

BRIEF DESCRIPTION OF THE DRAWINGS

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

FIGS. 2A and 2B show a comparison of discharge capacity and FIGS. 2D and 2E show a comparison of capacity retention at 1 C (FIGS. 2A and 2D) and 6 C cycling (FIGS. 2B and 2E) of NMC811 samples in the voltage window of 3-4.3V. FIGS. 2C and 2F show a comparison of charge and discharge rate capability, and FIGS. 2G and 2H show GITT measurements during the 1st and 100th discharge cycle at 6 C for PC811 and Poly-SC811, respectively. FIG. 2I shows a comparison of GITT discharge curves of PC811 and Poly-SC811 measured after 100 cycles at 6 C rate. The results are the average of data collected on three cells.

DETAILED DESCRIPTION

Figures 1A, 1B, 1C, 1D, 1E, 1F:
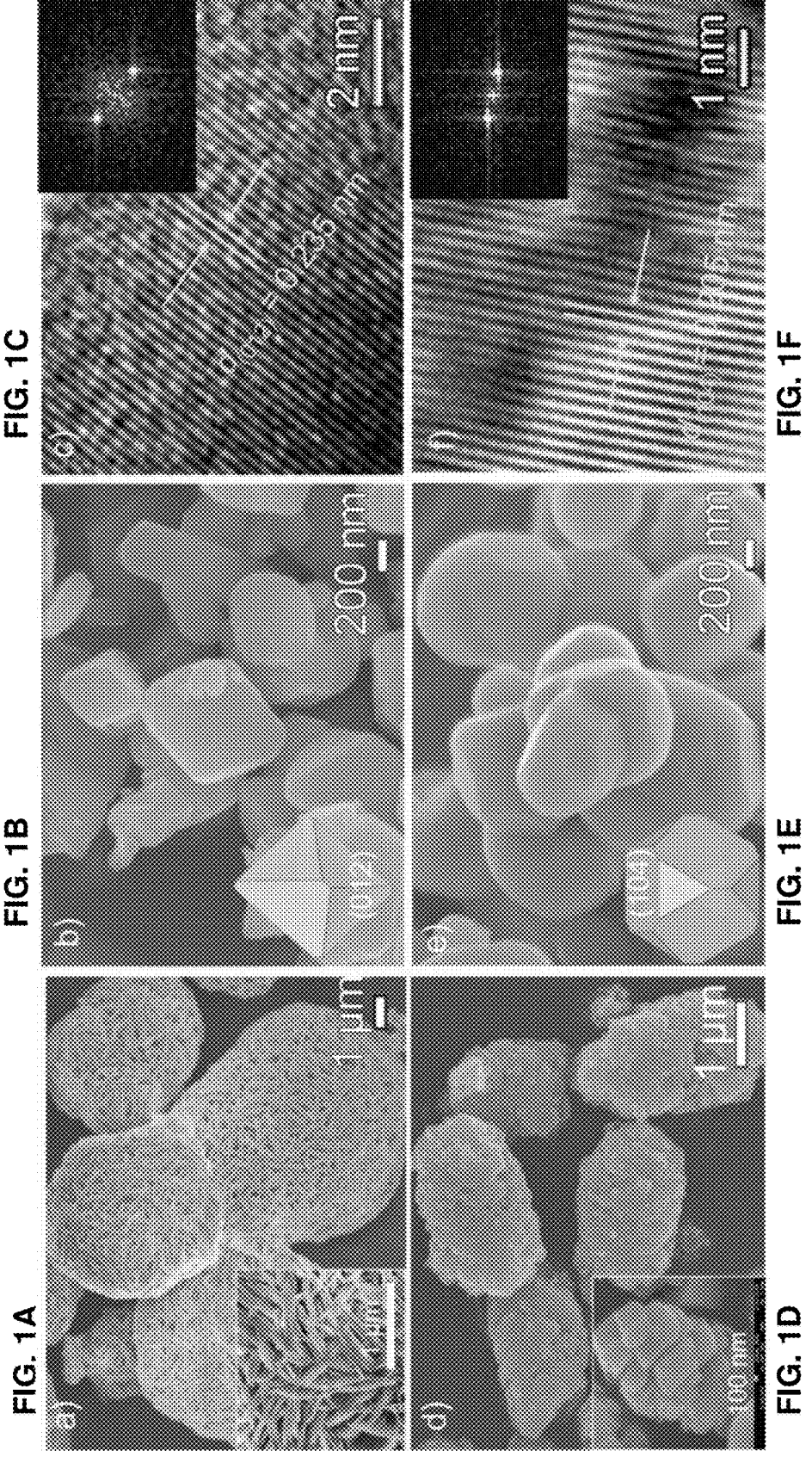
FIGS. 1A and 1B show SEM images of Ni$_{0.8}$Co$_{0.1}$Mn$_{0.1}$(OH)$_2$ intermediate (FIG. 1A) and Oct-SC811 (FIG. 1B). The inset in FIG. 1B is a schematic illustrating an octahedron particle shape and its corresponding dominating surface facets.
FIG. 1C shows an HRTEM image and the corresponding Fourier transformed pattern of Oct-SC811.
FIGS. 1D and 1E show SEM images of Ni$_{0.8}$Co$_{0.1}$Mn$_{0.1}$CO$_3$ intermediate (FIG. 1D) and Poly-SC811 (FIG. 1E). The inset in FIG. 1E is a schematic illustrating a polyhedron particle shape and its corresponding dominating surface facets.
FIG. 1F shows an HRTEM image and the corresponding Fourier transform pattern of Poly-SC811.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Single-crystal (SC) NMCs have recently been shown to deliver enhanced cycling stability under high-voltage operations, gaining the spotlight as promising next-generation high-energy cathode materials. The performance improvement is attributed to the lower surface area as well as better cracking resistance due to the absence of grain boundaries, alleviating side reactivities between NMC and the electrolyte that is one of the dominant failure mechanisms in PC-NMCs upon high-voltage or high-rate cycling. Recent theory work suggested that surface facets also play an important role in the reactivities between NMCs and the electrolyte. In Ni-rich NMCs, it has been shown theoretically that (104) surface has the lowest energy whereas (012) and (100) are among the ones with the highest surface energy. Surface effect on Li transport is also believed to exist, however, experimental correlations among NMC surface orientation, reactivities, and Li transport properties are difficult to establish, as they require well-controlled samples.

A number of approaches have been reported on SC-NMC synthesis, including molten-salt method, high-temperature annealing, rheological reactions, and high-energy ball milling. High-quality SCs, however, with narrow size distribution and defined shape and surface facets are difficult to synthesize and scale up. The higher Ni content in Ni-rich NMCs further adds to the challenges because of their higher reactivities and the need for oxygen atmosphere in synthesis.

Described herein are two methods for synthesizing SC $LiNi_{0.8}Co_{0.1}Mn_{0.1}O_2$ (NMC811) with controlled morphology and surface orientation. Octahedron-shaped SC-NMC811 (referred to as Oct-SC811 hereafter) with predominately (012)-family surfaces and polyhedron-shaped SC-NMC811 (referred to as Poly-SC811 hereafter) with predominately (104)-family surfaces were obtained.

Conventional layered NMC particles are typically prepared by a two-step process: (1) synthesis of a TM intermediate using the coprecipitation method; and (2) annealing the intermediate with a lithium source at high temperatures. Similar processes have also been adopted to prepare SC-NMCs. As the morphology of the intermediate prepared in the first step often plays a critical role in that of the final NMC particles, here we control SC-NMC811 synthesis by using two approaches in preparing the intermediate: coprecipitation and hydrothermal synthesis.

Figure 3:
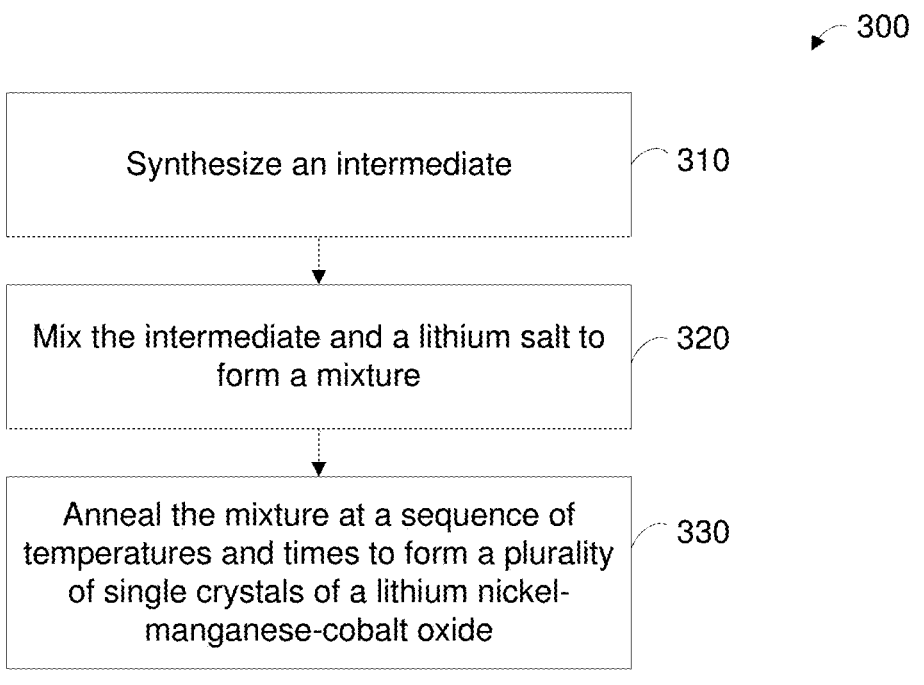
FIG. 3 shows an example of a flow diagram illustrating a manufacturing process for single crystals of a lithium nickel-manganese-cobalt oxide.

FIG. 3 shows an example of a flow diagram illustrating a manufacturing process for single crystals of a lithium nickel-manganese-cobalt oxide. Starting at block 310 of the process 300 shown in FIG. 3, an intermediate selected from a group of a nickel-manganese-cobalt nitrate, a nickel-manganese-cobalt acetate, a nickel-manganese-cobalt sulfate, a nickel-manganese-cobalt chloride, and a nickel-manganese-cobalt phosphate is synthesized. In some embodiments, the intermediate is formed using a co-precipitation process. For example, in a co-precipitation process, a solution of nickel, manganese, and cobalt precursors are added to a basic solution under an $N_2$ atmosphere. Simultaneously, a hydroxide solution is added into the mixture while maintaining the pH at about 10 to 13. In some embodiments, the intermediate is formed using a hydrothermal synthesis process. For example, in a hydrothermal synthesis process, stoichiometric amounts of nickel, manganese, and cobalt precursors and urea are dissolved in a mixture of ethanol and distilled water. This solution is then transferred into an autoclave (e.g., a Teflon-lined stainless-steel autoclave) and heated to about 160° C. to 200° C. for about 24 hours.

At block 320 of the process 300, the intermediate and a lithium salt selected from a group of LiOH, LiCl, $LiNO_3$, $LiSO_4$, LiF, LiBr, $Li_3PO_4$, $Li_2CO_3$, and combinations thereof are mixed to form a mixture. In some embodiments, the intermediate and the lithium salt are ground together (e.g., with a mortar and pestle) to form the mixture.

At block 330 of the process 300, the mixture is annealed at a sequence of temperatures and times, including or consisting of holding the mixture at about 850° C. to 950° C. for about 10 hours to 15 hours. There is no cooling of the mixture between operations of the sequence of temperatures and times. This operation forms a plurality of single crystals of a lithium nickel-manganese-cobalt oxide.

In some embodiments, the mixture is annealed at the following sequence of temperatures and times:

first, at about 300° C. to 350° C. for about 2 hours to 4 hours; and second, at about 850° C. to 950° C. for about 10 hours to 15 hours.

There is no cooling of the mixture between operations of the sequence of temperatures and times.

In some embodiments, the mixture is annealed at the following sequence of temperatures and times:

first, at about 500° C. to 550° C. for about 2 hours to 5 hours; and second, at about 850° C. to 950° C. for about 10 hours to 15 hours.

There is no cooling of the mixture between operations of the sequence of temperatures and times.

In some embodiments, the mixture is annealed at the following sequence of temperatures and times:

first, at about 300° C. to 350° C. for about 2 hours to 4 hours;

second, at about 500° C. to 550° C. for about 2 hours to 5 hours; and third, at about 850° C. to 950° C. for about 10 hours to 15 hours.

There is no cooling of the mixture between operations of the sequence of temperatures and times.

In some embodiments, not all of the mixture forms single crystals of the lithium nickel-manganese-cobalt oxide. I.e., some particles of the lithium nickel-manganese-cobalt oxide that are formed are not single crystals and are instead polycrystalline. In some embodiments, the plurality of single crystals of the lithium nickel-manganese-cobalt oxide are about 95% or more of the lithium nickel-manganese-cobalt oxide generated at block 330.

In some embodiments, each of the plurality of single crystals of the lithium nickel-manganese-cobalt oxide have a size of about 30 nanometers to 10 microns.

In some embodiments, the plurality of single crystals of the lithium nickel-manganese-cobalt oxide are $LiNi_xMn_yCo_{1-x-y}O_2$, $0.33 \leq x \leq 1$.

In some embodiments, the sequence is performed in an inert gas atmosphere. In some embodiments, the inert gas is helium, nitrogen, or argon. In some embodiments, when sequence is performed in an inert gas atmosphere, the plurality of single crystals of the lithium nickel-manganese-cobalt oxide are $LiNi_xMn_yCo_{1-x-y}O_2$, $0.33 \leq x < 0.8$.

In some embodiments, the sequence is performed in an oxygen atmosphere. In some embodiments, when sequence is performed in an oxygen atmosphere, the plurality of single crystals of the lithium nickel-manganese-cobalt oxide are $LiNi_xMn_yCo_{1-x-y}O_2$, $0.8 \leq x \leq 1$. In some embodiments, the plurality of single crystals of the lithium nickel-manganese-cobalt oxide are $LiNi_{0.8}Co_{0.1}Mn_{0.1}O_2$.

In some embodiments, about 95% or more of each of the plurality of single crystals of the lithium nickel-manganese-cobalt oxide are polyhedron-shaped particles with (104)-family surfaces. In some embodiments, about 95% or more of each of the plurality of single crystals of the lithium nickel-manganese-cobalt oxide are polyhedron-shaped particles with (104)-family surfaces when the intermediate is synthesized using a hydrothermal synthesis process. In some embodiments, about 90% or more of each of the plurality of single crystals of the lithium nickel-manganese-cobalt oxide are octahedron-shaped particles with (012)-family surfaces. In some embodiments, about 90% or more of each of the plurality of single crystals of the lithium nickel-manganese-cobalt oxide are octahedron-shaped particles with (012)-family surfaces when the intermediate is synthesized using a co-precipitation process.

In some embodiments, a heating rate to attain each of the temperatures in the sequence is about is about 1° C./minute to 25° C./minute, or about 5° C./minute. In some embodiments, using a different heating rate generates a plurality of single crystals of the lithium nickel-manganese-cobalt oxide having a shape other than polyhedron-shaped particles or octahedron-shaped particles.

In some embodiments, the process 300 further includes cooling the mixture to about room temperature at a cooling rate of about 1° C./minute to 100° C./minute. For example, such a cooling rate may be achieved by turning off power to the furnace and letting it cool. In another example, fast cooling may be achieved by quenching in a cooling environment. In some embodiments, using a different cooling rate generates a plurality of single crystals of the lithium nickel-manganese-cobalt oxide having a shape other than a polyhedron-shaped particles or octahedron-shaped particles. In some embodiments, using a different heating rate and a different cooling rate generates a plurality of single crystals of the lithium nickel-manganese-cobalt oxide having a shape other than a polyhedron-shaped particles or octahedron-shaped particles.

In some embodiments, the mixture includes a dopant, and the plurality of single crystals of the lithium nickel-manganese-cobalt oxide include a dopant. In some embodiments, the dopant is aluminum, titanium, magnesium, iron, boron, gallium, chromium, vanadium, zirconium, fluorine, or niobium.

Figure 4:
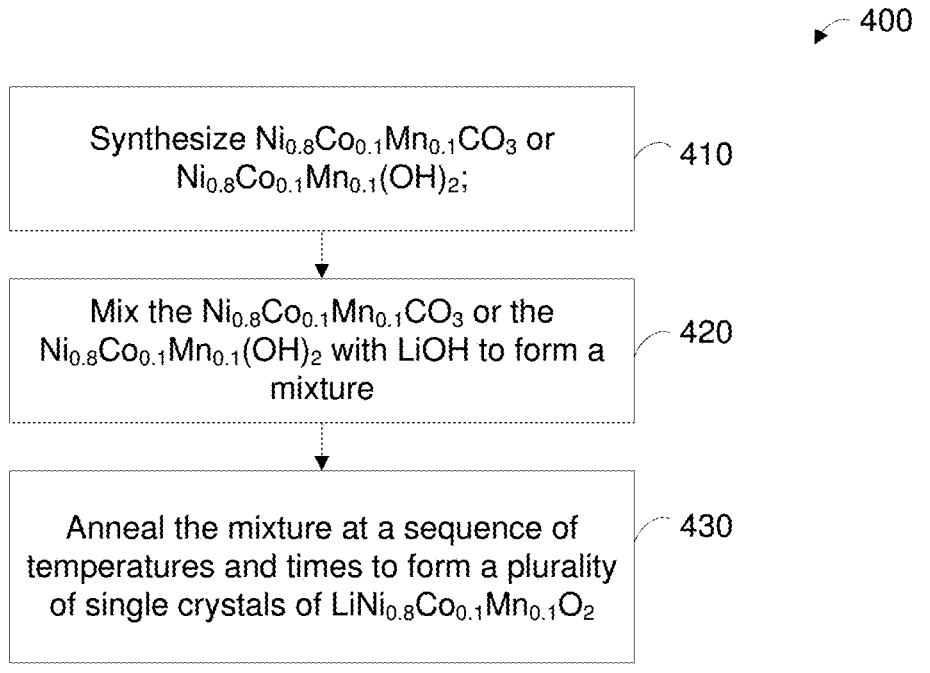
FIG. 4 shows an example of a flow diagram illustrating a manufacturing process for single crystals of LiNi$_{0.8}$Co$_{0.1}$Mn$_{0.1}$O$_2$ (NMC811).

FIG. 4 shows an example of a flow diagram illustrating a manufacturing process for single crystals of $LiNi_{0.8}Co_{0.1}Mn_{0.1}O_2$ (NMC811). Starting at block 410 of the process 400 shown in FIG. 4, $Ni_{0.8}Co_{0.1}Mn_{0.1}CO_3$ or $Ni_{0.8}Co_{0.1}Mn_{0.1}(OH)_2$ is synthesized. In some embodiments, the $Ni_{0.8}Co_{0.1}Mn_{0.1}CO_3$ or the $Ni_{0.8}Co_{0.1}Mn_{0.1}(OH)_2$ is formed using a co-precipitation process or a hydrothermal synthesis process.

At block 420 of the process 400, the $Ni_{0.8}Co_{0.1}Mn_{0.1}CO_3$ or the $Ni_{0.8}Co_{0.1}Mn_{0.1}(OH)_2$ is mixed with LiOH to form a mixture. In some embodiments, the $Ni_{0.8}Co_{0.1}Mn_{0.1}CO_3$ or the $Ni_{0.8}Co_{0.1}Mn_{0.1}(OH)_2$ and the LiOH are ground together (e.g., with a mortar and pestle) to form the mixture.

At block 430 of the process 400, the mixture is annealed in an oxygen atmosphere at a sequence of temperatures and times, including or consisting of holding the mixture at about 850° C. to 950° C. for about 10 hours to 15 hours. There is no cooling of the mixture between operations of the sequence of temperatures and times. This operation forms a plurality of single crystals of $LiNi_{0.8}Co_{0.1}Mn_{0.1}O_2$.

In some embodiments, the mixture is annealed at the following sequence of temperatures and times:

first, at about 300° C. to 350° C. for about 2 hours to 4 hours; and second, at about 850° C. to 950° C. for about 10 hours to 15 hours.

There is no cooling of the mixture between operations of the sequence of temperatures and times.

In some embodiments, the mixture is annealed at the following sequence of temperatures and times:

first, at about 500° C. to 550° C. for about 2 hours to 5 hours; and second, at about 850° C. to 950° C. for about 10 hours to 15 hours.

There is no cooling of the mixture between operations of the sequence of temperatures and times.

In some embodiments, the mixture is annealed at the following sequence of temperatures and times:

first, at about 300° C. to 350° C. for about 2 hours to 4 hours;

second, at about 500° C. to 550° C. for about 2 hours to 5 hours; and third, at about 850° C. to 950° C. for about 10 hours to 15 hours.

There is no cooling of the mixture between operations of the sequence of temperatures and times.

In some embodiments, not all of the mixture forms single crystals of $LiNi_{0.8}Co_{0.1}Mn_{0.1}O_2$. I.e., some particles of $LiNi_{0.8}Co_{0.1}Mn_{0.1}O_2$ that are formed are not single crystals and are instead polycrystalline. In some embodiments, the plurality of single crystals of $LiNi_{0.8}Co_{0.1}Mn_{0.1}O_2$ are about 95% or more of the $LiNi_{0.8}Co_{0.1}Mn_{0.1}O_2$ generated at block 431.

In some embodiments, each of the plurality of single crystals of $LiNi_{0.8}Co_{0.1}Mn_{0.1}O_2$ have a size of about 1 micron to 5 microns.

In some embodiments, when the $Ni_{0.8}Co_{0.1}Mn_{0.1}CO_3$ or the $Ni_{0.8}Co_{0.1}Mn_{0.1}(OH)_2$ is synthesized using a hydrothermal synthesis process, about 95% or more of each of the plurality of single crystals of $LiNi_{0.8}Co_{0.1}Mn_{0.1}O_2$ are polyhedron-shaped particles with (104)-family surfaces.

In some embodiments, when the $Ni_{0.8}Co_{0.1}Mn_{0.1}CO_3$ or the $Ni_{0.8}Co_{0.1}Mn_{0.1}(OH)_2$ is synthesized using a co-precipitation process, about 90% or more of each of the plurality of single crystals of $LiNi_{0.8}Co_{0.1}Mn_{0.1}O_2$ are octahedron-shaped particles with (012)-family surfaces.

In some embodiments, a heating rate to attain each of the temperatures in the sequence is about is about 1° C./minute to 25° C./minute, or about 5° C./minute. In some embodiments, using a different heating rate may generate single crystals of $LiNi_{0.8}Co_{0.1}Mn_{0.1}O_2$ having a shape other than polyhedron-shaped particles or octahedron-shaped particles.

In some embodiments, the process 300 further includes cooling the mixture to about room temperature at a cooling rate of about 1° C./minute to 100° C./minute. For example, such a cooling rate may be achieved by turning off power to the furnace and letting it cool. In some embodiments, using a different cooling rate may generate single crystals of $LiNi_{0.8}Co_{0.1}Mn_{0.1}O_2$ having a shape other than polyhedron-shaped particles or octahedron-shaped particles. In some embodiments, using a different heating rate and a different cooling rate may generate single crystals of $LiNi_{0.8}Co_{0.1}Mn_{0.1}O_2$ having a shape other than polyhedron-shaped particles or octahedron-shaped particles.

In some embodiments, the mixture includes a dopant, and the plurality of single crystals of $LiNi_{0.8}Co_{0.1}Mn_{0.1}O_2$ include a dopant. In some embodiments, the dopant is aluminum, titanium, magnesium, iron, boron, gallium, chromium, vanadium, zirconium, fluorine, or niobium.

Figure 5:
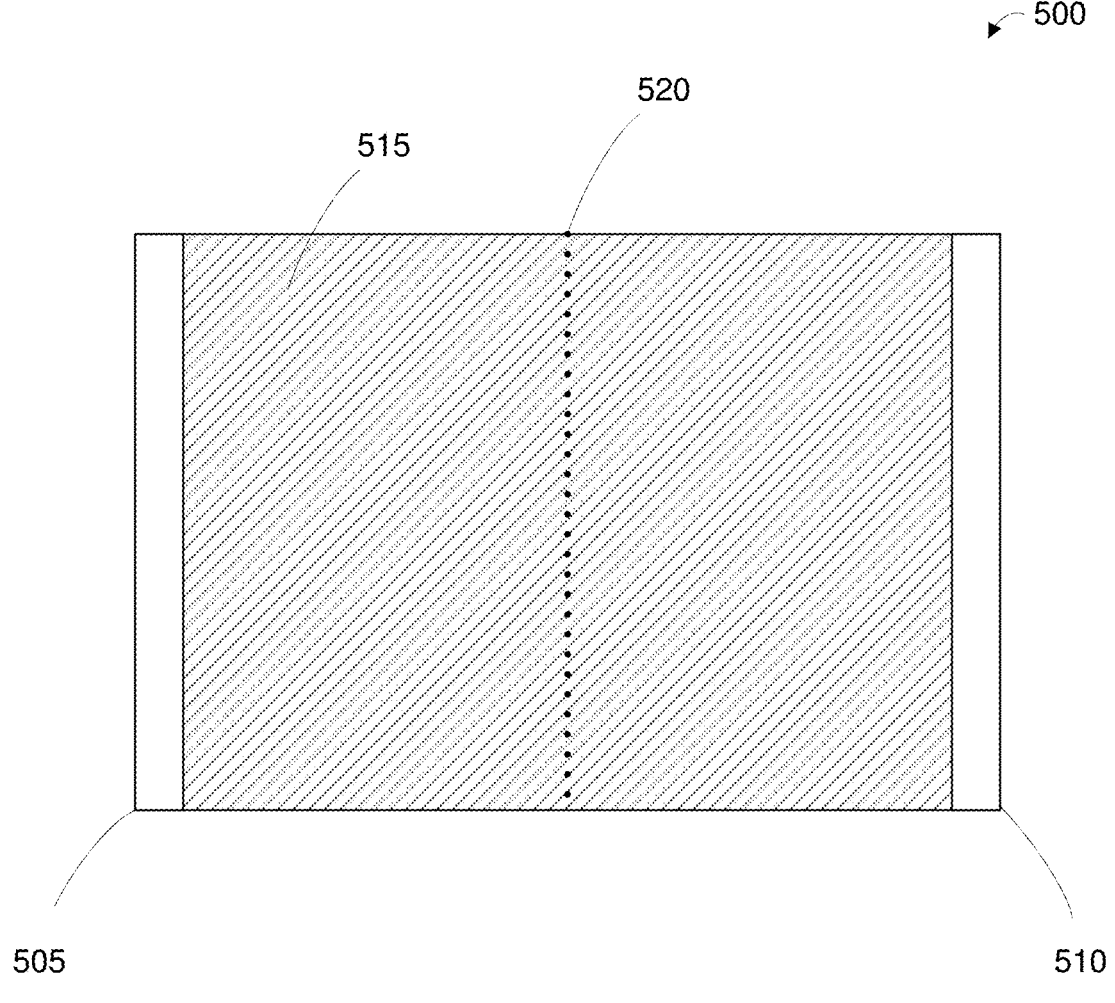
FIG. 5 shows an example of a schematic illustration of a lithium-ion battery.

FIG. 5 shows an example of a schematic illustration of a lithium-ion battery. As shown in FIG. 5, a lithium-ion battery includes an anode 505, a cathode 510, an electrolyte 515, and a separator 520. An electrode (i.e., a cathode) of the lithium-ion battery comprises a plurality of particles comprising $LiNi_xMn_yCo_{1-x-y}O_2$, $0.33 \leq x \leq 1$. About 90% or more of the plurality of particles comprise single crystals of $LiNi_xMn_yCo_{1-x-y}O_2$.

In some embodiments, each of single crystals of $LiNi_xMn_yCo_{1-x-y}O_2$ have a size of about 30 nanometers to 10 microns. In some embodiments, the plurality of particles comprising $LiNi_xMn_yCo_{1-x-y}O_2$ are particles of $LiNi_{0.8}Co_{0.1}Mn_{0.1}O_2$.

In some embodiments, about 95% or more of the plurality of particles are single crystal particles having a polyhedron-shape with (104)-family surfaces. In some embodiments, about 90% or more of the plurality of particles are single crystals having an octahedron-shape with (012)-family surfaces.

In some embodiments, the plurality of particles comprising $LiNi_xMn_yCo_{1-x-y}O_2$ include a dopant. In some embodiments, the dopant is aluminum, titanium, magnesium, iron, boron, gallium, chromium, vanadium, zirconium, fluorine, or niobium.

The following examples are intended to be examples of the embodiments disclosed herein, and are not intended to be limiting.

EXAMPLE

Synthesis and Properties of NMC811

In the coprecipitation method, $Ni_{0.8}Co_{0.1}Mn_{0.1}(OH)_2$ intermediate was prepared by mixing and stirring the solution of $NiSO_4.6H_2O$, $CoSO_4.7H_2O$, and $MnSO_4.H_2O$ into a solution of NaOH and $NH_4OH$ under an $N_2$ atmosphere. Maintaining the pH in the range of about 11-12 was important for the formation of the intermediate phase. The as-synthesized $Ni_{0.8}Co_{0.1}Mn_{0.1}(OH)_2$ typically comprised secondary particles with densely-packed elongated primary grains, with an average secondary particle size of ≈5-8 μm (FIG. 1A). The final NMC product was obtained by annealing the obtained intermediate with $LiOH.H_2O$ (with about 5 mol. % excess) under an oxygen flow using a stepwise heating procedure. Discrete octahedron-shaped primary particles with an average size ≠1 μm were obtained (FIG. 1B). When viewed along the direction normal to the octahedron edge surface, the high-resolution (HR)TEM image and the corresponding fast Fourier transformation (FFT) diffraction pattern show an interlayer d-spacing of 2.35 Å (FIG. 1C), equivalent to that of the (012) planes. A total of at least 10 particles were examined and the results are consistent with each other. These results confirm that surface of Oct-SC811 particles is predominately enclosed by the (012)-family facets.

Compared to the coprecipitation method, hydrothermal synthesis has advantages including higher yield and more uniform size and morphology of the product. Synthesis parameters can be easily adjusted for size and morphology control, such as solvent choices and concentration, heating and cooling conditions such as ramping rate, temperature, and duration, etc. Stoichiometric amounts of $Ni(CH_3COO)$ $_2.4H_2O$, $Mn(CH_3COO)_2.4H_2O$, and $Co(CH_3COO)_2.4H_2O$ were dissolved in a mixture of ethanol and water. Urea (in a molar ratio of urea/total TM=3.5) was added as both a complexing agent and a precipitant. The mixture was then heated in a Teflon-lined stainless-steel autoclave at about 160-200° C. Solvent was found to play a critical role in influencing the size and morphology of the resulting $Ni_{0.8}Co_{0.1}Mn_{0.1}CO_3$ intermediate. Secondary particles with a uniform average size of about 1, 1.5, 2, and 2.5 μm were obtained.

To prepare SC-NMC811, the as-synthesized $Ni_{0.8}Co_{0.1}Mn_{0.1}CO_3$ intermediate was mixed with $LiOH.H_2O$ (with about 5 mol. % excess) and heated under an oxygen flow using a stepwise heating procedure. FIGS. 1D and 1E compare the SEM images collected from the synthesis using the about 2.5 μm-sized intermediate. While the $Ni_{0.8}Co_{0.1}Mn_{0.1}CO_3$ intermediate shows micro-sized rice-grain-shaped secondary particles composed of sub-micron platelets (FIG. 1D), the final NMC product includes discrete polyhedron-shaped primary particles with an average size of ≈1 μm (FIG. 1E). HRTEM imaging and corresponding FFT diffraction pattern display a set of clear lattice fringe with the interlayer d-spacing of 2.05 Å when viewed along the direction normal to the polyhedron vertex surface (FIG. 1F). This corresponds to (104) planes, confirming that surface of Poly-SC811 particles is predominately enclosed by (104)-family facets.

As shown in low-magnification SEM images, both SC samples have fairly uniform particle size, with the vast majority of the particles showing the distinctive octahedron shape for Oct-SC811 and polyhedron shape for Poly-SC811. The well-defined particle morphologies readily differentiate these samples from those reported in the literature. For comparison, PC NMC811 (referred to as PC811) baseline was also prepared following the standard procedure in the literature. As expected, the sample included spherical secondary particles with an average particle size of HRTEM analysis found a number of planes on the surface, confirming the nature of random orientation on PC811 surface. The most frequently observed was an interlayer d-spacing of 4.7 Å, suggesting preferred presence of (003) surface planes.

X-ray diffraction (XRD) patterns collected on PC811, Oct-SC811, and Poly-SC811 show that all samples adopted the hexagonal $\alpha$-$NaFeO_2$-type structure (R-3m space group) without the presence of impurities. Elemental analysis carried out using ICP measurements further confirmed the target chemical composition of $LiNi_{0.8}Co_{0.1}Mn_{0.1}O_2$.

EXAMPLE

Details of the Synthesis of Polycrystalline and Single Crystal NMC

For PC PC811, $Ni_{0.8}Co_{0.1}Mn_{0.1}(OH)_2$ intermediate was prepared by following the procedure set forth in S. Maeng, Y. Chung, S. Min, Y. Shin, J. Power Sources 2020, 448, 227395, which is herein incorporated by reference. Final NMC product was obtained by annealing the intermediate with $LiOH.H_2O$ (5 mol. % excess) in a step wise heating procedure in oxygen atmosphere, at about 350° C., 550° C., and then 780° C. for about 10 h. The small-sized PC811-small sample was similarly prepared except that smaller-sized (≈4-5 μm) $Ni_{0.8}Co_{0.1}Mn_{0.1}(OH)_2$ intermediate particles were used.

To synthesize Oct-SC811, $Ni_{0.8}Co_{0.1}Mn_{0.1}(OH)_2$ precursor was first obtained through a co-precipitation process. A solution of $NiSO_4.6H_2O$, $CoSO_4.7H_2O$, and $MnSO_4.H_2O$ was added into a solution of NaOH and $NH_4OH$ under $N_2$ atmosphere. Simultaneously, about 10 mol $L^{-1}$ of NaOH (aq.) and about 3.8 mol $L^{-1}$ of $NH_4OH$ were also added into the reaction mixture. The pH was maintained at about 11-12. The washed and dried precursor was mixed with $LiOH.H_2O$ (about 5 mol. % excess) followed with stepwise annealing up to about 930° C. for about 20 h under a continuous oxygen flow.

Poly-SC811 was prepared via a hydrothermal method followed by annealing. In a typical procedure, stoichiometric amounts of $M(CH_3COO)_2.4H_2O$ (M=Ni, Co, Mn) and urea were dissolved in ethanol and distilled water mixture. This mixed solution was then transferred into Teflon-lined stainless-steel autoclave and heated to about 160-200° C. for about 24 h. During the hydrothermal process, urea acts as both complexing agent and precipitant, involving following reactions with TM cations:

$$CO(NH_2)_2 + H_2O \rightarrow 2NH_3 + CO_2 \qquad (1)$$

$$NH_3 + H_2O \rightarrow NH_4^+ + OH^- \qquad (2)$$

$$CO_2 + 2OH^- \rightarrow CO_3^{2-} + H_2O \qquad (3)$$

$$M^{2+} + CO_3^{2-} \rightarrow MCO_3 (M=Ni, Co, Mn) \qquad (4)$$

The obtained $Ni_{0.8}Co_{0.1}Mn_{0.1}CO_3$ precursor was washed with distilled water and ethanol several times and dried in vacuum oven for overnight. This precursor was then ground together with $LiOH.H_2O$ (about 5 mol. % excess) and calcinated stepwise at about 350, 550, and 900° C. under an oxygen atmosphere, with a total heating time of about 20 h.

EXAMPLE

Figure 2A:
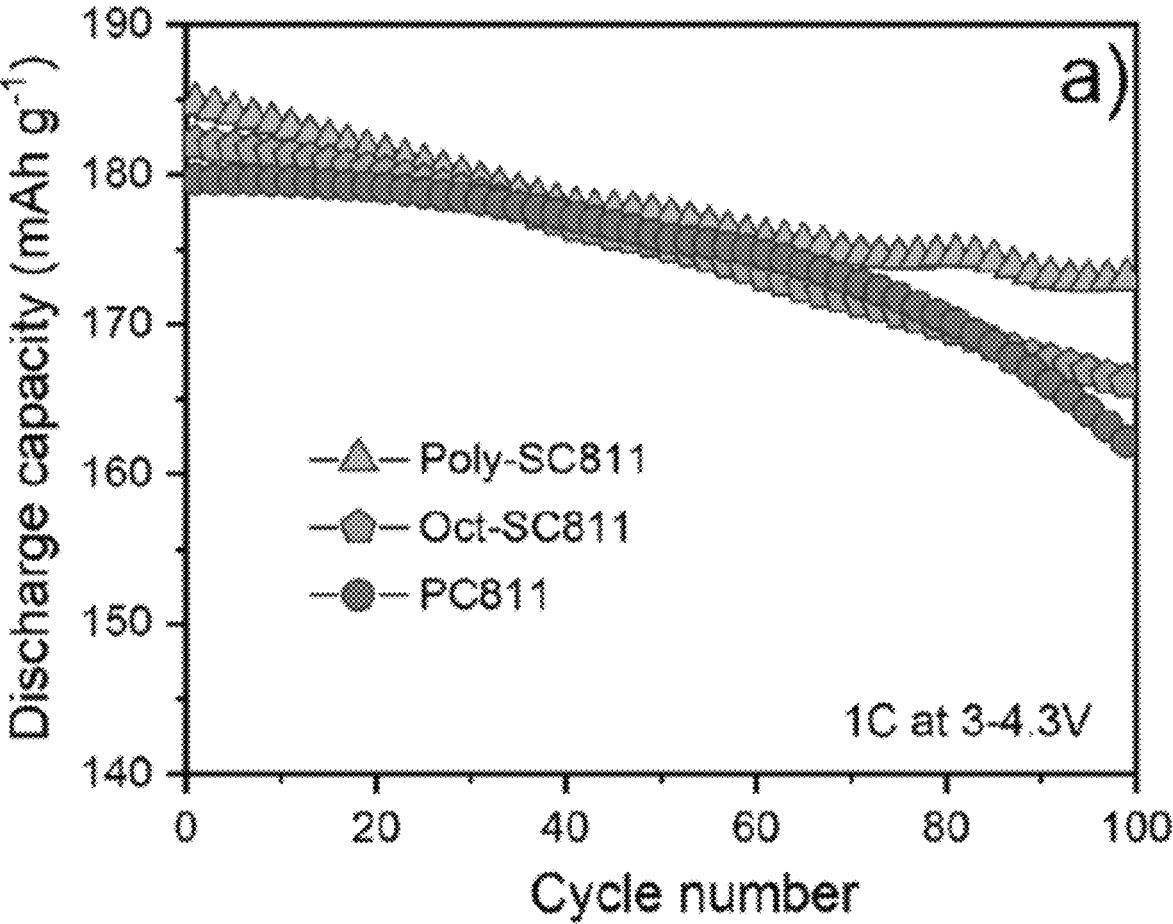
FIGS. 2A-2I show examples of the graphs of the electrochemical performance of cells including composite cathodes including PC811, Oct-SC811, or Poly-SC811.
Figure 2B:
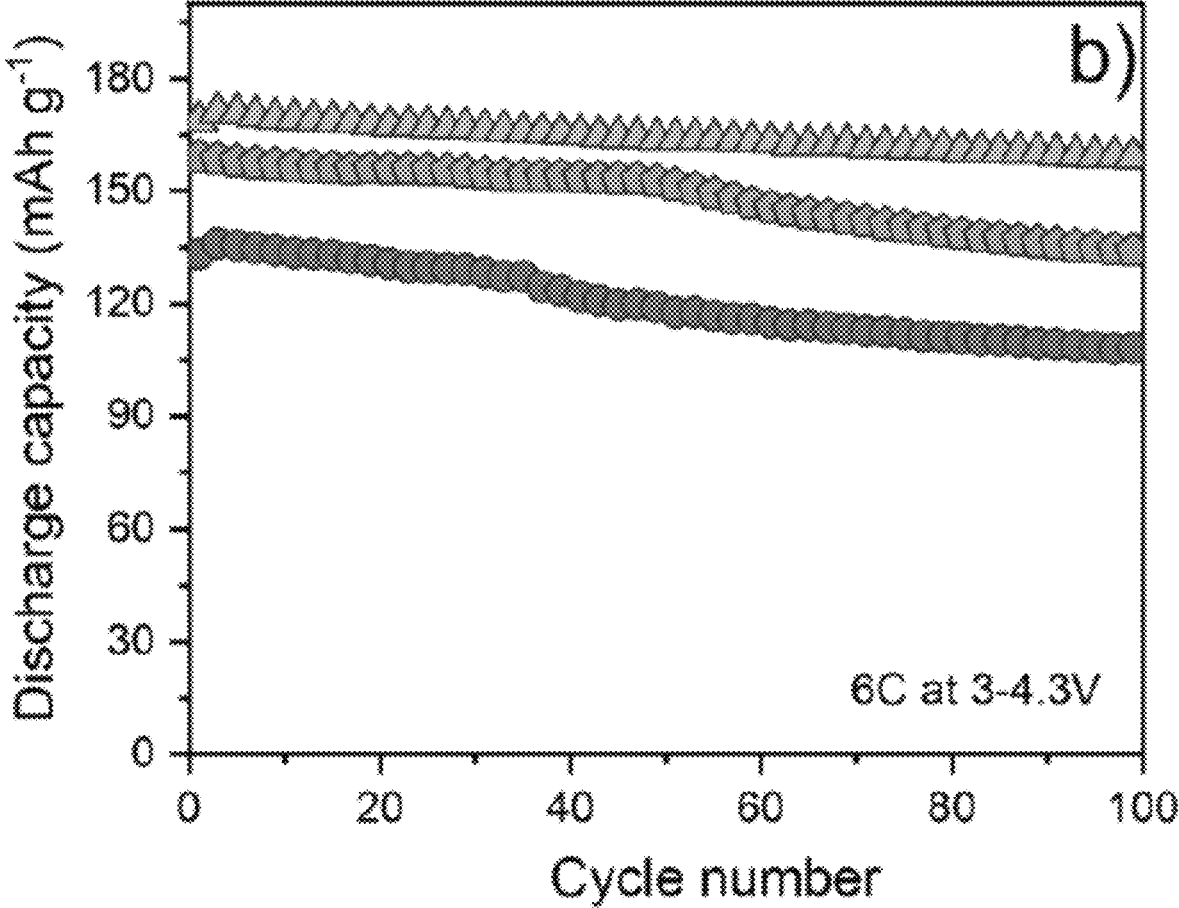

Electrochemical Performance of Cells Including Single-Crystal $LiNi_xMn_yCo_{1-x-y}O_2$ Composite cathodes were prepared with an active material (PC811, Oct-SC811, or Poly-SC811) loading of 90 wt. %, following the standard slurry mixture formulation of NMC, carbon black, and polyvinylidene fluoride (PVdF). Electrochemical performance of the cathodes cycled in half-cell coin cells between 3.0-4.3 V (versus $Li^+/Li$) are compared in FIGS. 2A-2I. The 1st charge/discharge voltage profiles and capacities at 1C of PC811, Oct-SC811, and Poly-SC811 is appeared nearly identical. FIG. 2A compares 1 C discharge capacity as a function of cycle number. All samples showed a similar initial discharge capacity of ≈180-185 mAh $g^{-1}$, however, both SC cathodes demonstrated improved cycling stability compared to PC811 that had a performance similar to what was reported in the literature. After 100 cycles, the remaining capacities were 162, 166, and 173 mAh $g^{-1}$ for PC811, Oct-SC811, and Poly-SC811, respectively. This corresponds to a capacity fade of 10%, 8.8%, and 6.3% (FIG. 2D).

Upon increasing the charge/discharge rate to 6 C, all samples experienced an increase in polarization and a reduction in 1st cycle coulombic efficiency (CE). Compared to PC811, much lower 1st cycle polarization was found on Poly-SC811 sample, especially during the 1st charge. The initial discharge capacity was significantly reduced but to a varying degree, with 133, 159, and 169 mAh $g^{-1}$ obtained on PC811, Oct-SC811, and Poly-SC811, respectively. After 100 cycles, the remaining capacities were 108, 134, and 159 mAh $g^{-1}$ for PC811, Oct-SC811, and Poly-SC811, respectively (FIG. 2B), corresponding to a capacity fade of ≈19%, 15.7%, and 5.9% (FIG. 2E).

Figure 2C:
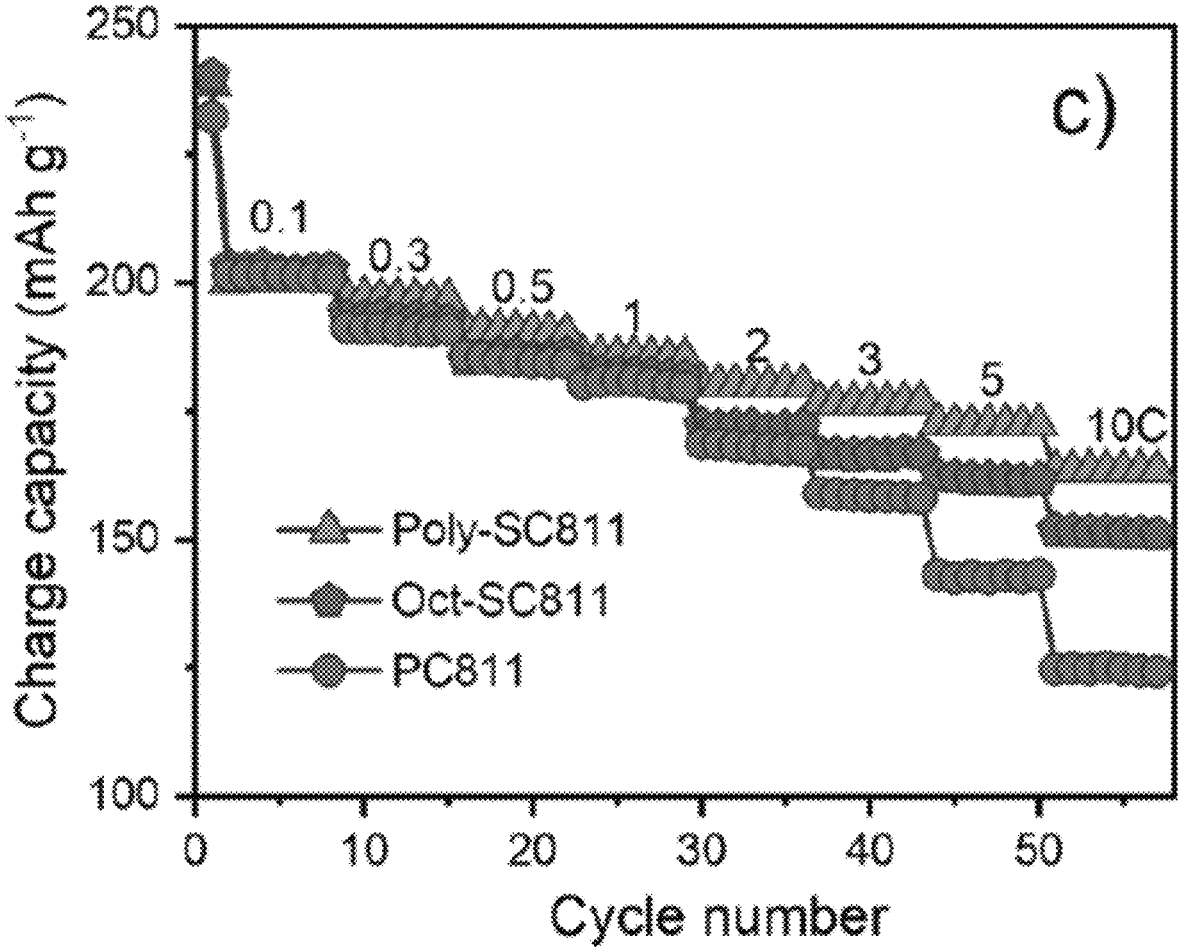
Figure 2D:
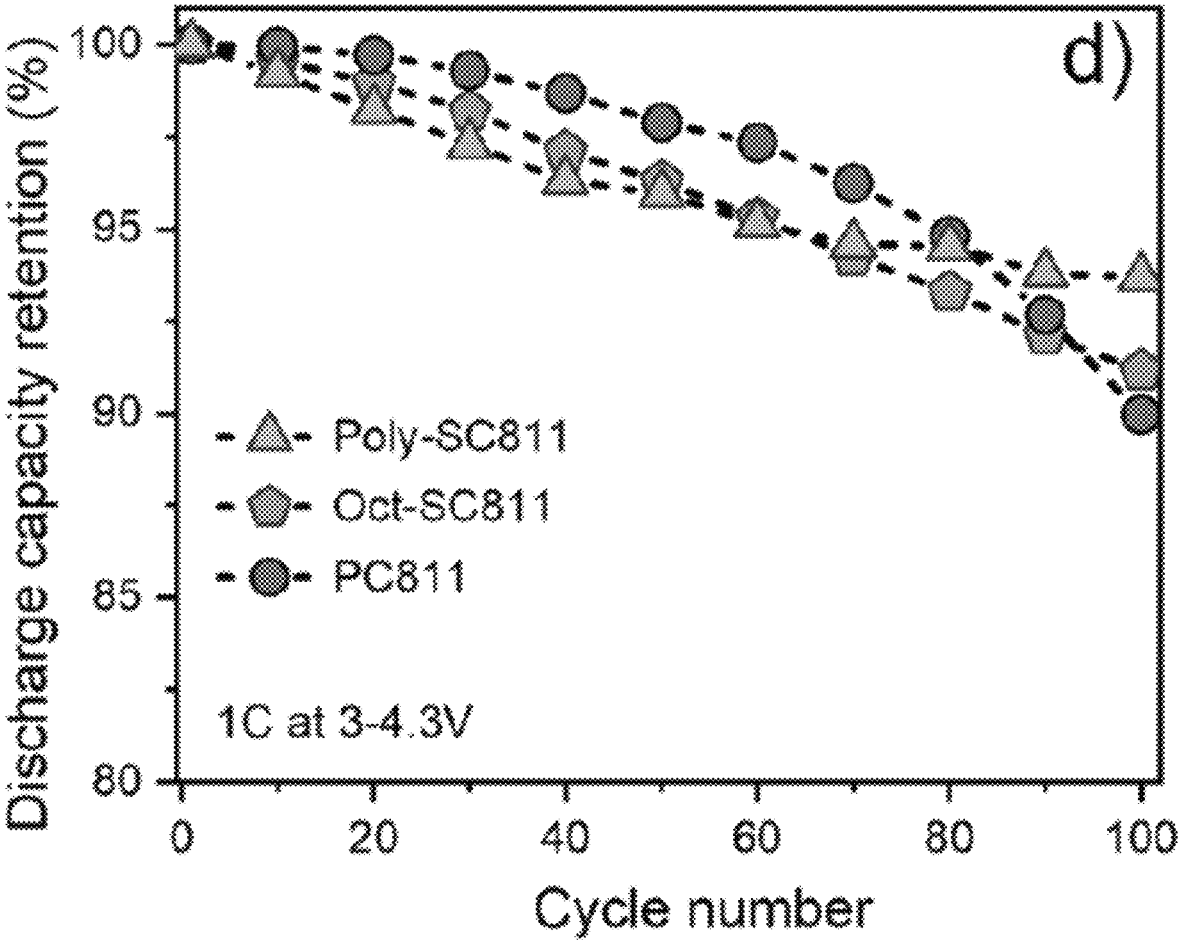
Figure 2E:
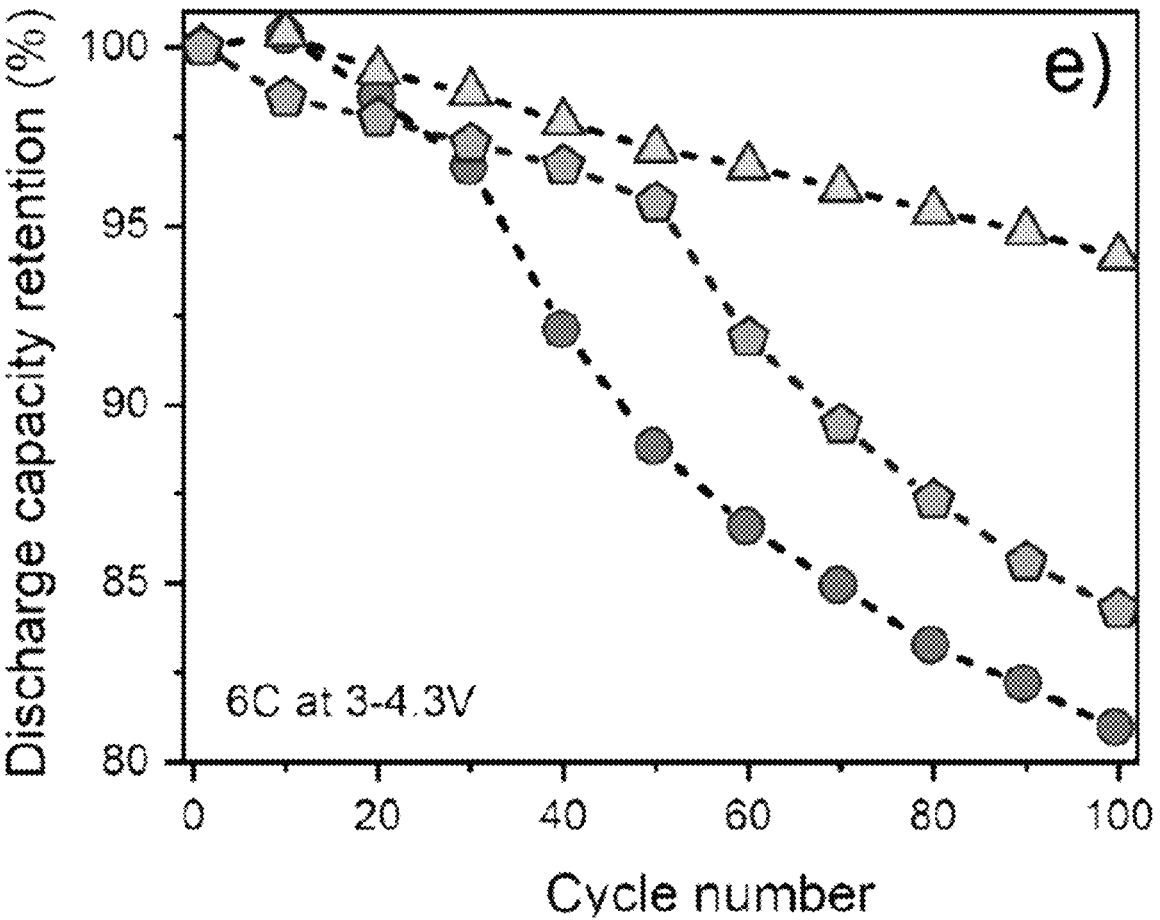
Figure 2F:
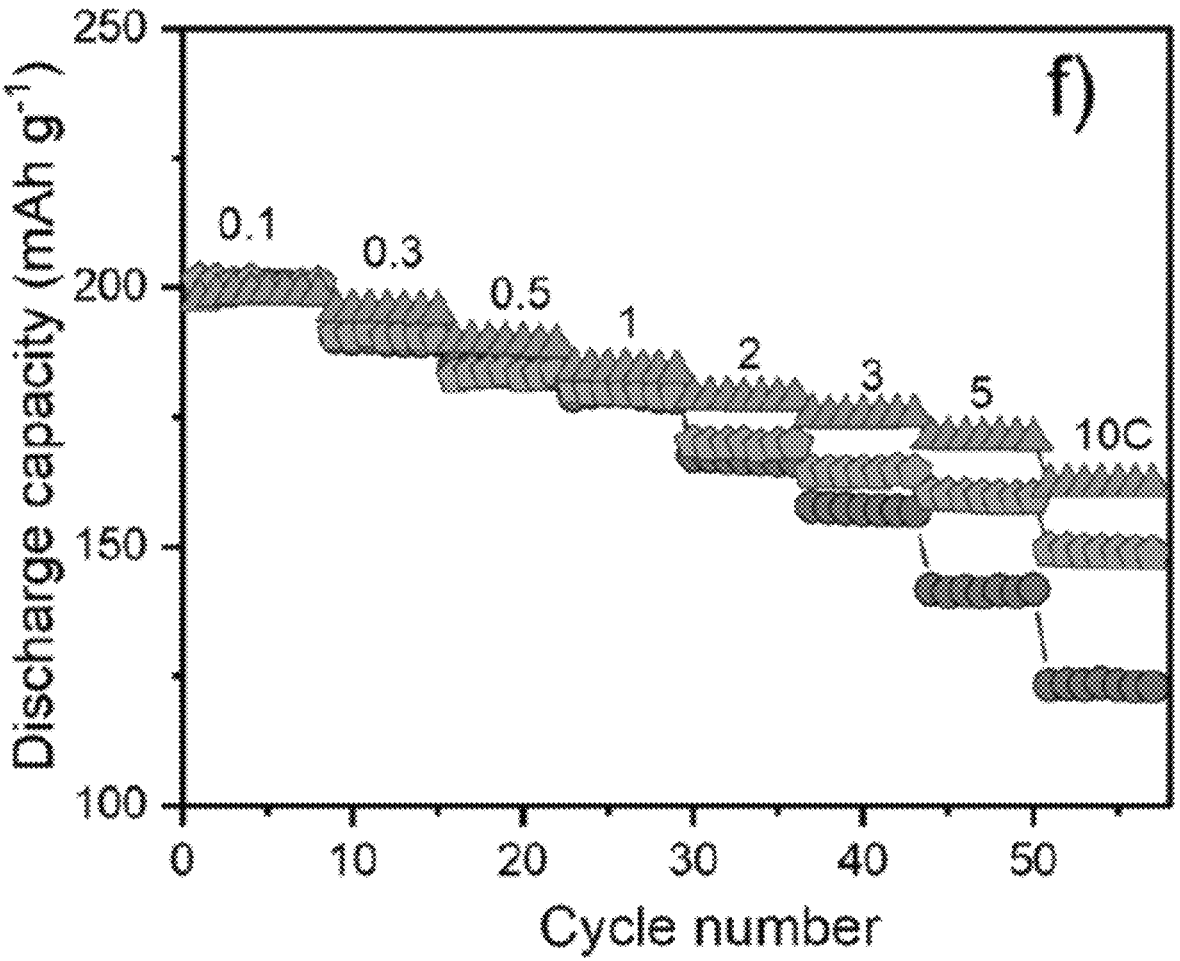

FIGS. 2C and 2F compare the charge and discharge rate capabilities of the cathodes cycled between 3.0-4.3 V at various current densities. While all NMC811 cathodes delivered similar charge and discharge capacity of ≈200 mAh $g^{-1}$ at 0.1 C, SC samples significantly outperformed PC-NMC811 at higher rates. Poly-SC811 delivered a reversible capacity of ≈165 mAh $g^{-1}$ even at 10 C rate whereas the PC sample had about 38% capacity loss going from 0.1 C to 10 C rate. To evaluate the effect of particle size on rate performance, a PC811 sample with a relatively smaller particle size of ≈4-5 μm was also prepared by using a similar synthesis procedure. Although a rate improvement was achieved by reducing particle size of the PC sample, SC Poly-SC811 remained the best performer in the series, confirming its improved rate capability compared to that of the conventional PC samples.

Figure 2G:
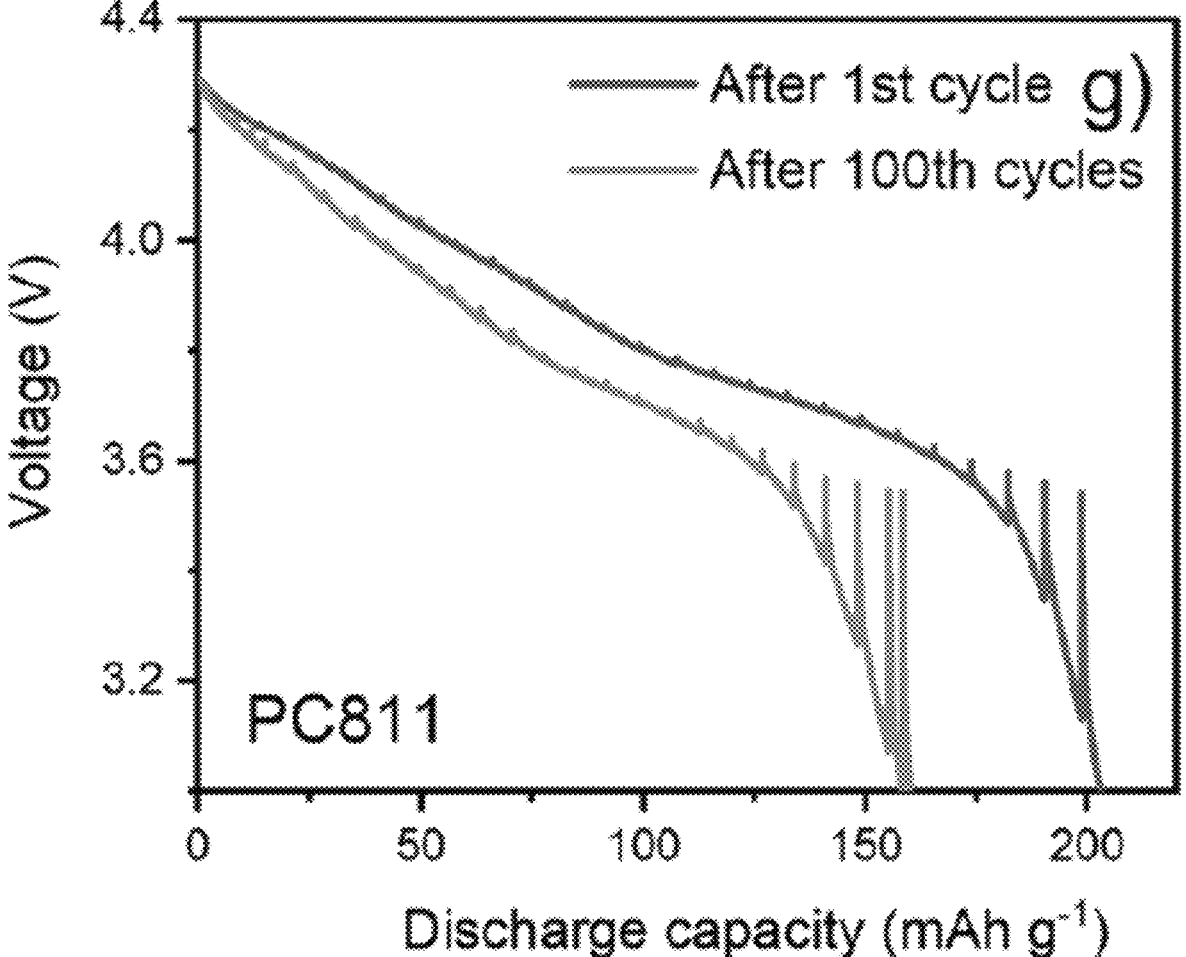
Figure 2H:
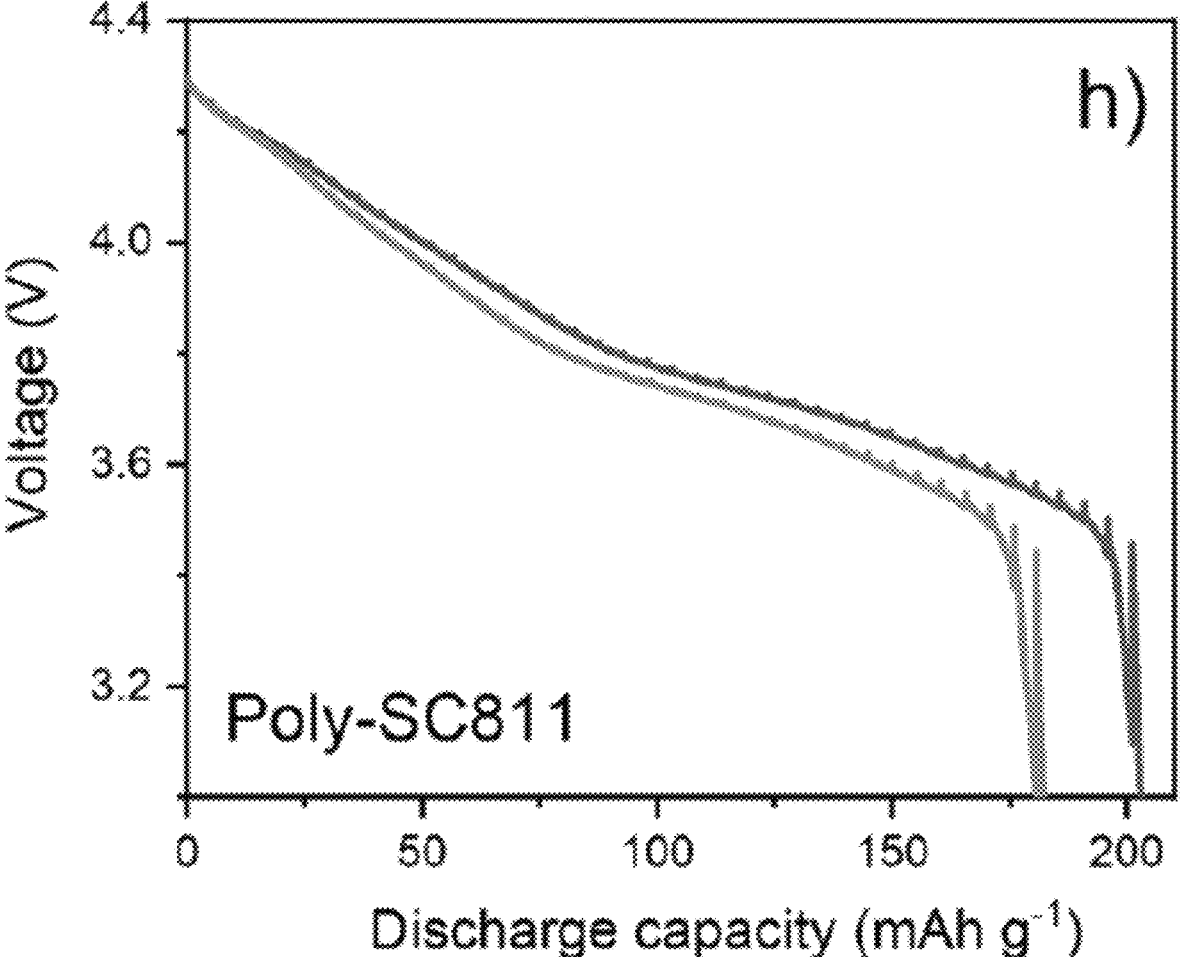
Figure 2I:
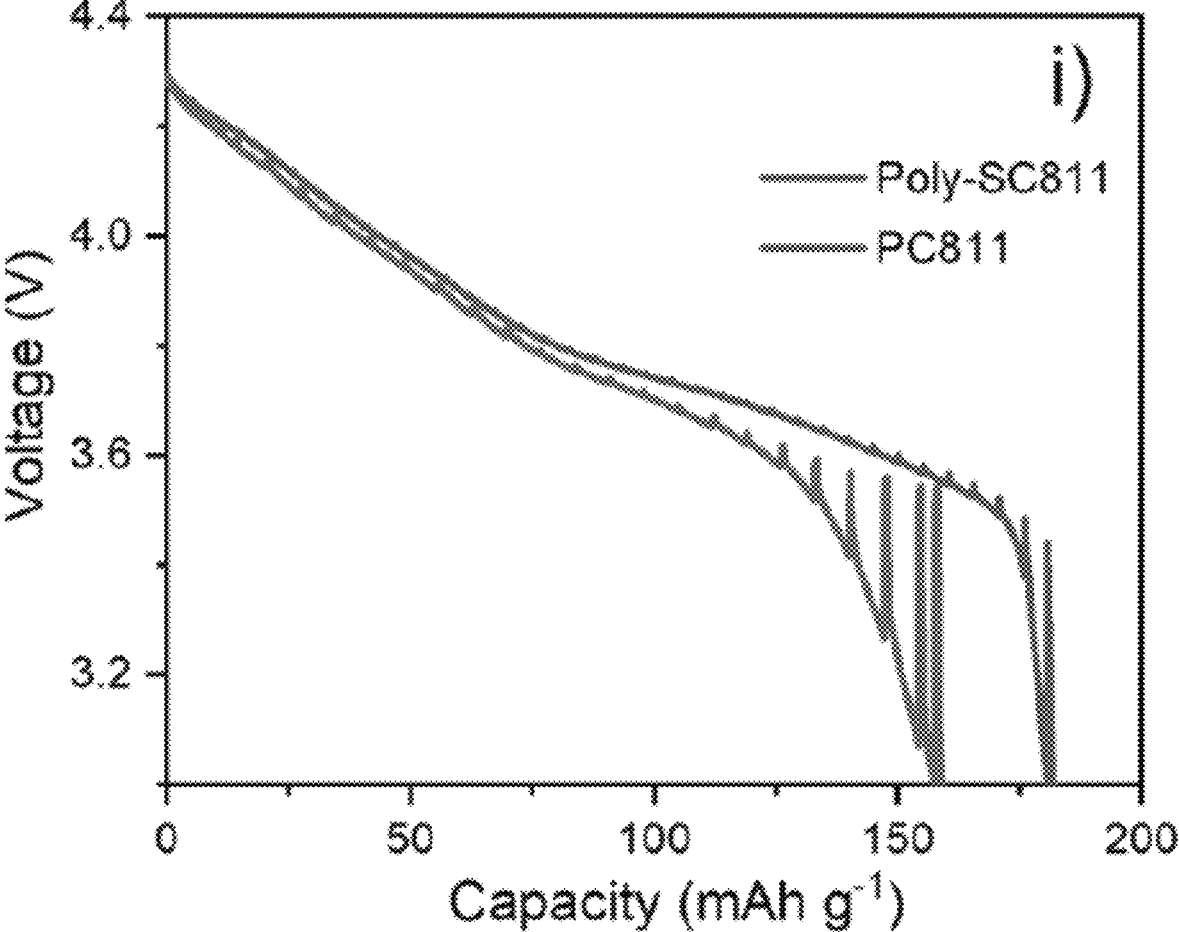

Further insights on the kinetic properties were evaluated by galvanostatic intermittent titration technique (GITT) measurements. The experiments were carried out after the 1st and 100th cycles at 6 C, using a titration current of 10 mA $g^{-1}$ (equivalent to a rate of 0.05 C). FIGS. 2G and 2H show the relationship between cell voltage and discharge capacity for PC811 and Poly-SC811, respectively. While the voltage profiles are similar after the 1st cycle, much higher polarization was observed on PC811 after 100 cycles at 6 C. This is shown in discharge profile comparison of both samples after 100 cycles (FIG. 2I). As electrode polarization is directly correlated to cell overpotential, the value at each step was determined by the voltage differences between the open circuit voltage and the voltage at the end of applied current. Further analysis was performed by deconvoluting the contribution of ohmic polarization and non-ohmic/voltage polarization to the overpotential. Compared to the cycled PC811, there was an overall smaller polarization and voltage loss in Poly-SC811. More significantly, the large ohmic loss (or IR drop) in cycled PC811 indicates degraded electron transport at the electrode level, likely a result of particle cracking and isolation of active materials.

CONCLUSION

Further details regarding the embodiments described herein can be found in Yanying Lu et al., "Single-Crystal $LiNi_xMn_yCo_{1-x-y}O_2$ Cathodes for Extreme Fast Charging", Small, Volume 18, Issue 12, Mar. 24, 2022, 2105833, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:

(a) synthesizing $Ni_{0.8}Co_{0.1}Mn_{0.1}CO_3$ or $Ni_{0.8}Co_{0.1}(OH)_2$;

(b) mixing the $Ni_{0.8}Co_{0.1}Mn_{0.1}CO_3$ or $Ni_{0.8}Co_{0.1}(OH)_2$ with LiOH to form a mixture; and (c) annealing the mixture in an oxygen atmosphere at a sequence of temperatures and times to form a plurality of single crystals of $LiNi_{0.8}Co_{0.1}Mn_{0.1}O_2$, with no cooling of the mixture between operations of the sequence of temperatures and times, the sequence of temperatures and times being as follows:

first, at about 300° C. to 350° C. for about 2 hours to 4 hours;

second, at about 500° C. to 550° C. for about 2 hours to 5 hours; and third, at about 850° C. to 950° C. for about 10 hours to 15 hours.

2. The method of claim 1, wherein the plurality of single crystals of $LiNi_{0.8}Co_{0.1}Mn_{0.1}O_2$ are about 95% or more of the $LiNi_{0.8}Co_{0.1}Mn_{0.1}O_2$ generated in operation (c).

3. The method of claim 1, wherein operation (a) is performed using a co-precipitation process or a hydrothermal synthesis process.

4. The method of claim 1, wherein each of the plurality of single crystals of $LiNi_{0.8}Co_{0.1}Mn_{0.1}O_2$ have a size of about 1 micron to 5 microns.

5. The method of claim 1, wherein operation (a) is performed with a hydrothermal synthesis process, and wherein about 95% or more of each of the plurality of single crystals of $LiNi_{0.8}Co_{0.1}Mn_{0.1}O_2$ are polyhedron-shaped particles with (104)-family surfaces.

6. The method of claim 1, wherein operation (a) is performed using a co-precipitation process, and wherein about 90% or more of each of the plurality of single crystals of $LiNi_{0.8}Co_{0.1}Mn_{0.1}O_2$ are octahedron-shaped particles with (012) -family surfaces.

7. The method of claim 1, wherein synthesizing the $Ni_{0.8}Co_{0.1}Mn_{0.1}CO_3$ comprises:

dissolving a nickel precursor, a manganese precursor, a cobalt precursor, and urea in ethanol and water to form a mixture; and heating the mixture to about 160° C. to 200° C. for about 24.

8. The method of claim 7, wherein the nickel precursor is $Ni(CH_3COO)_24H_2O$, the manganese precursor is $Mn(CH_3COO)_24H_2O$, and the cobalt precursor is $Co(CH_3COO)_24H_2O$.

9. The method of claim 1, wherein synthesizing the $Ni_{0.8}Co_{0.1}Mn_{0.1}(OH)_2$ comprises:

dissolving a nickel precursor, a manganese precursor, a cobalt precursor in a first solution that is basic to form a mixture; and adding a hydroxide solution to the mixture while maintaining the pH of the mixture at about 10 to 13.

10. The method of claim 9, wherein the nickel precursor is $NiSO_46H_2O$, the manganese precursor is $MnSO_4H_2O$, and the cobalt precursor is $CoSO_47H_2O$, wherein the basic solution includes NaOH and $NH_4OH$, and wherein the hydroxide solution includes NaOH and $NH_4OH$.

* * * * *